Nov. 1, 1949     W. C. HUEBNER     2,486,849
RIGHT-ANGLE IMAGE REVERSER FOR CAMERAS
Filed Aug. 20, 1947     2 Sheets-Sheet 1

INVENTOR.
William C. Huebner
BY
Parker Brockman & Former
Attorneys.

Nov. 1, 1949 W. C. HUEBNER 2,486,849
RIGHT-ANGLE IMAGE REVERSER FOR CAMERAS
Filed Aug. 20, 1947 2 Sheets-Sheet 2
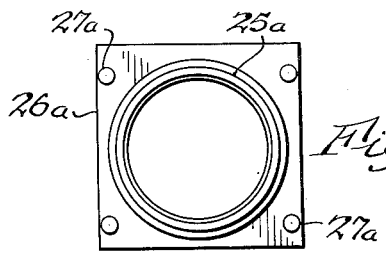
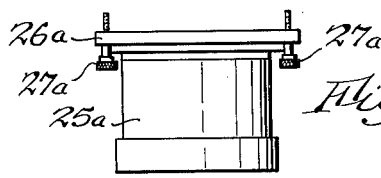
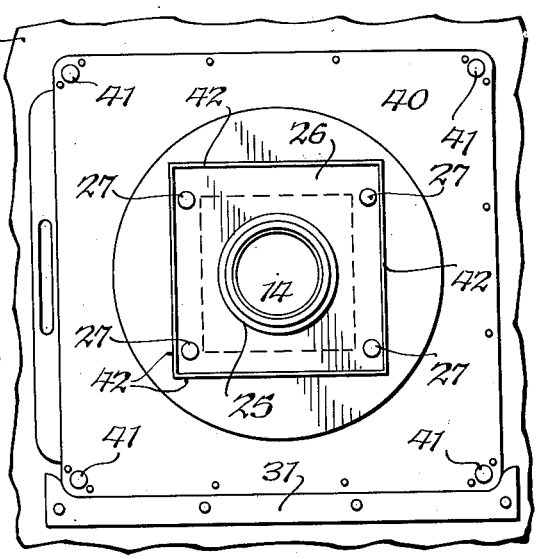
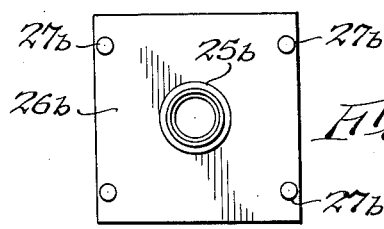
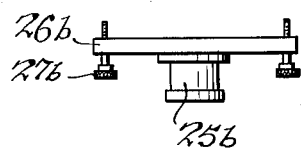
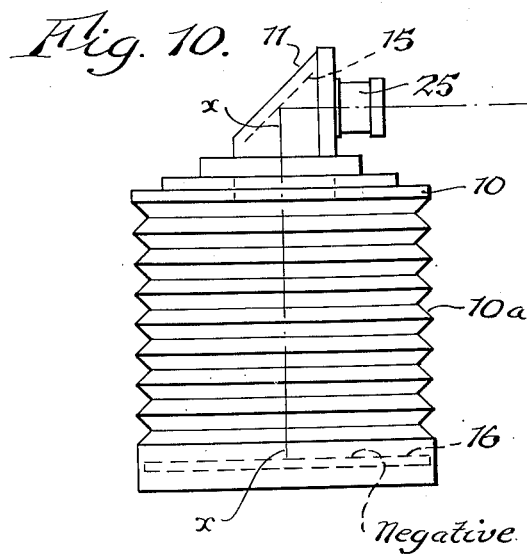
INVENTOR.
William C. Huebner,
BY
Parker Brodnow Farmer
Attorneys.

Patented Nov. 1, 1949

2,486,849

UNITED STATES PATENT OFFICE 2,486,849

RIGHT-ANGLE IMAGE REVERSER FOR CAMERAS

William C. Huebner, New York, N. Y.

Application August 20, 1947, Serial No. 769,605

6 Claims. (Cl. 88—24)

This invention relates to improvements in cameras and particularly to a right angle image reverser or means for effecting a right angle reversal of the image projected by the camera lens from the copy onto the negative or sensitized surface in the camera.

When a negative is made in a straight line camera in which the camera lens is arranged with its axis in the direction of the optical axis of the camera, or in a direction perpendicular to the plane of the negative or sensitized surface, the image formed on the negative surface, when viewing that surface, is reversed with respect to the copy from which the image is projected by the lens. Thus, when a contact print is made from the negative, the resulting print reads like the copy.

It is desirable or necessary in certain kinds of photographic work, to have the image on the negative surface, when viewing that surface, positioned like or to read the same as the copy. For example, whenever a negative is made on a photoengraver's camera for the purpose of producing a photoengraved relief etched plate to be printed on typographic presses, it is necessary to have the image on the surface of the negative to read like the copy so that when a contact print is made from the negative, the resulting print reads in reverse. In order to accomplish this reversing of the image, right angle cameras have been used in which a glass or transparent prism is placed over or in front of the camera lens, and when taking a picture, the camera is arranged so that one right angle surface of the prism faces the copy or subject which is located at one side of the camera opposite said right angle surface of the prism.

In photomechanical reproduction frequently camera lenses of three different sizes or focal lengths are used, such as lenses of 19", 24" and 30" focus. In order to use such different lenses on right angle cameras of the type heretofore known, having the prism arranged over or in front of the lens, three separate prisms, one for each lens, must be employed, in order to avoid the necessity for removing the prism from one lens and mounting it on a different lens. To properly and precisely mount and adjust the prism in association with the camera lens is a difficult, tedious and time-consuming operation. Thus, the cost and loss of operating time in the use of such image-reversing cameras are extensive and it is difficult to ensure uniformly squared images. Also, since all prisms cause more or less distortion of the image, due to the stria present in the body of the glass forming the prism, there results, in the use of such cameras, the well known distortions and inaccuracies in negative images, which are fatal to certain classes of work. Additional difficulties are experienced in the practical use of prisms on right angle cameras. The larger sized copies are difficult to illuminate evenly because of the necessity for placement of arc lamps too close to the side of the right angle camera, resulting in hot spot illumination, which limits the reversing of images to a limited class of work.

One of the purposes of the right angle image reverser of this invention is to provide means for quickly and easily mounting lenses of whatever different sizes, focuses or kinds may be required for the work in hand, accurately in like position or axial alinement on the same image reversing device, and thus ensure that all of the images on the negatives will be accurately squared and free of distortion.

Another purpose of this invention is to eliminate the use of any prism and thus avoid passing the image through a mass of glass or the like, and so remove the danger of distortion of the image resulting from stria in the body of the prism.

Another purpose of the invention is to avoid all image distortion by the use of a single optically flat reflecting surface disposed in a housing at an angle of 45° to the axis of the camera lens and facing the lens and also an opening in the housing through which the image is reflected to the negative in the camera; and which also permits the use of various different lenses without any readjustment of the optically flat reflector surface or the lenses, and thus ensures accurately squared and non-distorted reversed images from the different lenses.

According to the right angle image reverser of this invention, after the image of the copy enters the reverser housing through the camera lens, it is reflected to the negative or sensitized surface in the camera by an optically flat reflecting surface which may be the surface of a glass plate which is ground level and polished to within one and one-half wave lengths of light accuracy measured by Newton ring optical measurements. This optically flat surface may be covered with a fine metallic deposit, such as magnesium fluoride applied electrically in a vacuum chamber. Thus, the image projected to the negative no longer passes through any medium except the camera lens and is not subject to distortion, such as would result from the stria in the body of a prism.

Other objects of the invention are to provide a right angle image reverser equipped with a slide shutter to close the reverser housing to the admission of light, after exposure of a reversed image; also to provide means which enables the removal of the image reverser from the usual lens board of the camera and its replacement with a lens board adaptor on which any of the various different lenses used with the image reverser may be quickly and conveniently mounted in like axial alinement for straight line or non-reversed image production, to thereby adapt a camera for use either as a straight line camera or as a right angle image reversing camera, without the necessity of removing the lenses from their individual adaptor plates or individually adjusting the lenses on the camera.

Further objects and advantages of the invention will appear from the following specification of the preferred embodiment of the invention shown in the accompanying drawings, and the novel features of the invention are set forth in the appended claims.

In said drawings:

Fig. 5 is a front elevation of an interchangeable adaptor plate and lens holder with a lens of larger size than that shown in Figs. 1-4.

Fig. 6 is a plan view of the adaptor plate and lens holder of Fig. 5.

Figs. 7 and 8 are views corresponding respectively to Figs. 5 and 6 of an adaptor plate and lens holder for a lens of smaller size then shown in Figs. 1-4.

Fig. 9 is a front or face view of a lens board and lens board adaptor having one of the adaptor plates with the lens mounted thereon to adapt the camera for straight line use.

Fig. 10 is a somewhat diagrammatic view illustrating the use of an image reversing camera embodying the invention.

Figures 1, 2:
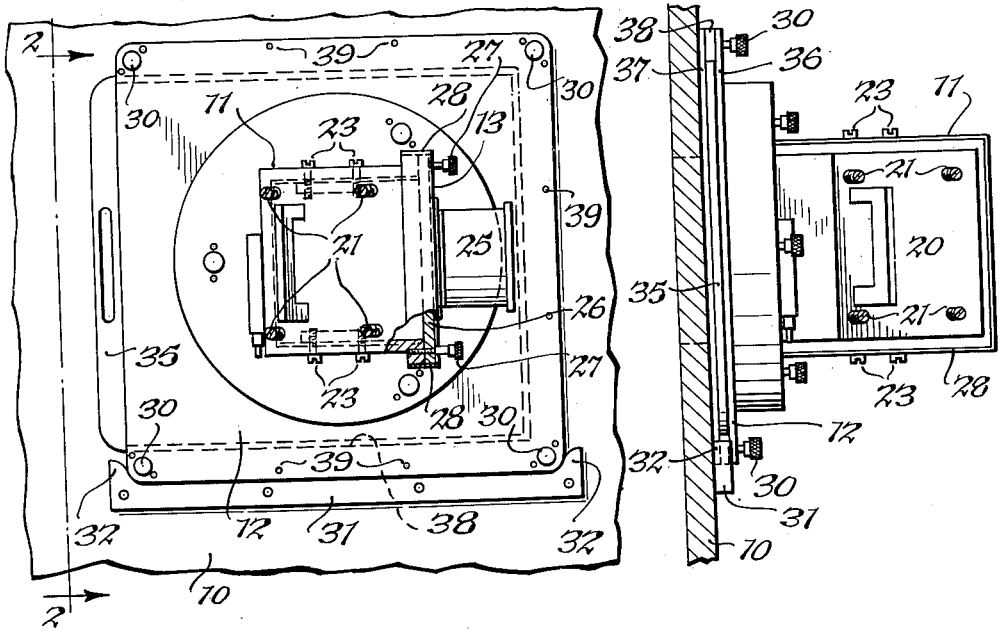
Fig. 1 is a front or face view of a camera lens board equipped with a right angle image reverser embodying the invention.
Fig. 2 is a sectional elevation thereof on line 2—2, Fig. 1, showing in elevation the side of the image reverser opposite to that on which the lens is mounted.
Figure 3:
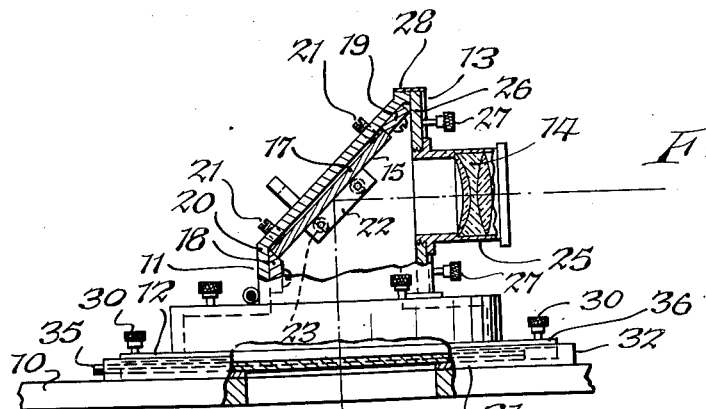
Fig. 3 is an elevational view thereof showing the image reverser partly in section on line 3—3, Fig. 1.
Figure 4:
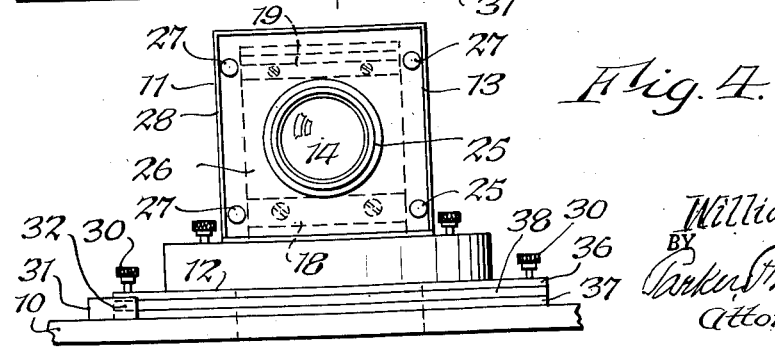
Fig. 4 is an elevation thereof as viewed when looking at the camera lens in the direction of its axis.

Referring to the drawings, 10 represents the lens board or front end part of a camera on which the camera lens is usually mounted and which may form the front wall of the chamber or bellows 10a (Fig. 10) of an ordinary camera. The right angle image reverser is mounted on and projects forwardly from this lens board or part and includes a housing 11 having a base portion 12 which is arranged face to face with and suitably secured on the lens board, and a side or wall 13, which projects perpendicularly forward from the base 12 and on which the camera lens, indicated at 14, Fig. 3, is mounted, with the lens facing to one side of the camera with its axis perpendicular to the longitudinal or optical axis of the camera, indicated by the line x—x in Fig. 10. The illustration of the lens in Fig. 3 is simply for the purpose of indicating the location of a suitable camera lens in its holder or tube 25. The lens and tube may be of any usual or suitable type and construction appropriate for the kind of work to be produced. Within the housing 11 is a reflecting surface 15 which is arranged to face toward both the base 12 and side 13 of the housing in a plane at an angle of 45° to the planes of said base and side, so as to reflect the image projected thereon from the copy or subject by the camera lens 14 at right angles to the lens axis into the camera lengthwise of its optical axis towards the negative or sensitized surface 16 in the camera chamber. The base 12 and side 13 of the housing are provided with suitable openings for the passage of the images projected from the lens and reflected from the reflecting surface. This reflecting surface is preferably a metallic reflecting surface which may be formed as by a thin film of magnesium fluoride electrically deposited in a vacuum chamber on the optically flat front surface of a plate 17 of glass or other suitable material, thus forming a first surface reflector. A glass plate 17 is desirable since it can be ground level and polished to within one and one-half wavelengths of light accuracy measured by Newton ring optical measurements.

The reflector plate 17 is suitably mounted, preferably adjustably, to enable its reflecting surface 15 to be positioned with great precision at an angle of 45° to both the axis of the lens and the optical axis of the camera and perpendicularly to a plane coinciding with said axes. As shown, this reflector plate is supported by opposite edge cleats or strips 18 and 19 on the inner side of a wall 20 of the reverser housing, which extends obliquely at an angle of approximately 45° to the base of the reverser housing. In order to ensure absolute precision of positioning of the optically flat reflecting surface, adjusting screws 21 extend through threaded holes in said oblique wall 20 and bear against the reflector plate 17 adjacent the corners thereof. By appropriate adjustment of these screws, the reflector plate can be adjusted or tilted in the different directions necessary to place its reflecting surface precisely in the required 45° plane. When the precise positioning of the reflector surface has been obtained by adjustment of the screws 21, the plate is clamped and securely held in the adjusted position, as by clamping bars 22 secured by screws 23 to opposite, or top and bottom, walls of the housing 11 and adapted to bear against adjacent edge portions of the reflector plate. The screws 23 may pass through elongated slots in the walls of the housing to permit the necessary adjustment of the clamping bars to press the reflector plate against the adjusting screws 21, and so hold the plate firmly in the adjusted position by tightening screws 23. After once properly adjusting the reflector plate in the housing, there is no need for further change of position of the reflector in the use of the image reverser.

In order to enable lenses of different sizes, focuses or kinds to be interchangeably mounted quickly, easily and accurately on the reverser housing opposite and in the same axial relation to the reflecting surface 15, whatever may be the size or type of the lens, the lens tube or holder 25 is mounted on or carried by an adaptor plate 26 which is adapted to be removably secured on the side or wall 13 of the housing, and the adaptor plates for the several different lenses are alike or correspond with one another as to form or dimensions and as to the securing means therefor, so that the adaptor plate carrying one lens can be quickly and easily mounted on the housing interchangeably with the adaptor plate carrying a different lens and always ensure the same accurate axial relationship of each lens to the reflecting surface of the reverser. For this purpose, as shown, the adaptor plate 26 for the lens holder 25, shown in Figs. 1-4, is of square or rectangular shape and is removably secured on the outer face of the side or wall 13 of the housing by finger screws 27 passing through holes in corner portions of the adaptor plate into registering screw-threaded holes in the housing wall. The securing of the adaptor plate always in the same position on the housing is facilitated by a marginal rim or flange 28 which surrounds and projects forwardly from edge portions of the housing side or wall 13 on at least three sides of the wall 13, said flange being so located that when the adaptor plate is placed against the wall 13 within the seat or space bounded by the flange 28, the securing screws 27 on the adaptor plate will be accurately registered with the screw holes in the wall 13, so that the screws can be immediately screwed into the holes for securing the adaptor plate on the housing without need for shifting or moving the adaptor plate relatively to the housing to register the screws with their holes in the housing wall.

The adaptor plates 26a and 26b carrying the different sized lenses and lens holders 25a and 25b, shown in Figs. 5-8 correspond exactly in shape and dimensions with the adaptor plate 26 and have their securing screws 27a and 27b located in positions thereon corresponding with those for the screws of said first adaptor plate. Thus, when it is desired to remove one lens and substitute another on the reverser housing, this can be done quickly and easily, without the necessity for adjusting or shifting the position of the lens or its holder relatively to the reverser housing in order to ensure exactly the same position of the axis of any of the lenses relatively to the reflecting surface in the reverser housing, irrespective of the size or focal length of the lens to be used.

The image reverser may be removably mounted on the lens board 10 of the camera, for instance, by means of finger screws 30 passing through holes in the corner portions of the base of the reverser housing into screw threaded holes in the lens board, and the attachment or application of the image reverser to the lens board or camera always in the same positional relationship thereto is facilitated by means such as a locator bar 31 which is stationarily secured on the face of the lens board in such a position that when the base of the image reverser is placed against the face of the lens board so as to rest against the locator bar 31 with opposite side edges of the image reverser base between and against projecting lugs or end portions 32 of the locator bar, the attaching screws 30 for the image reverser will be located in register with their screw holes in the lens board, and it is simply necessary to tighten the screws to secure the reverser housing always in the same position on the camera.

The image reverser is also preferably equipped with a shutter 35 for shutting off the admission of light through the lens into the camera chamber. As shown, this shutter consists of a plate arranged to slide in and out in a shutter chamber formed in the base 12 of the image reverser. The shutter chamber may be conveniently formed in the base 12 of the image reverser by constructing the base of parallel base plates 36 and 37 spaced from each other by a spacing strip 38 arranged between the edges of the base plates 36 and 37 at three sides of the base, and to which the spaced plates are attached by suitable fastenings 39, thus forming a shallow chamber between the plates for the reception of the shutter plate, which is movable inwardly and outwardly through the opening left at one edge of the base between the parallel spacing bars at two opposite sides of the base.

Fig. 9 illustrates means for adapting the camera for use as a straight line camera by employing therewith one or another of the same adaptor plates with the lens carried thereby that is used with the image reverser for right angle reversal of the image. As here shown, these means comprise a lens board adaptor 40, Fig. 9, which is adapted to be secured on the lens board 10 of the camera, in place of the image reverser housing. This adaptor 40 corresponds in size and shape with the base of the reverser housing and has similarly located securing screws 41. When it is desired to use the camera for straight line work, the image reverser is removed and the lens board adaptor 40 is secured on the lens board in position against the locator bar 31 in the same position that the image reverser base previously occupied. The lens board adaptor may have, as shown, locator flanges 42 projecting from its outer or front side, which flanges define a seat or space corresponding in shape and size with the space defined by the projecting rim 28 on the side 13 of the reverser housing for the reception of the lens adaptor plates 26, 26a and 26b, so that any one of these adaptor plates with the lens carried thereby can be placed on the lens board adaptor 40 within and located as to position by the flanges 42 with the axis of the lens coinciding with the optical axis of the camera, and the lens adaptor plate 26, 26a or 26b is removably secured in place by its screws, which are located so as to be screwed into registering screw threaded holes formed in the lens board adaptor 40. Thus, to adapt the camera for straight line work, it is only necessary to remove the image reverser housing from the lens board and attach the lens board adaptor 40 in place thereof on the lens board, and then, depending upon the work to be produced, secure one or another of the lens adaptor plates 26, 26a or 26b with its lens in place on the lens board adaptor 40.

I claim:

1. A right angle image reverser for photographic cameras comprising a housing on one side of which a camera lens is supported over an opening in said side, said housing being mountable on a camera with the axis of said lens at right angles to the optical axis of the camera, a flat first surface reflector which is disposed within said housing with its reflecting surface in a plane at an angle of 45° to the axis of said lens and facing the lens, said reflecting surface reflecting the image projected by said lens through an opening in said housing into the camera, an adaptor plate which carries said lens on an exterior surface of said housing, and means removably securing said adaptor plate with said lens thereon on said housing, said housing and adaptor plate having portions which are engageable with each other and cooperate by such engagement to locate said adaptor plate with said lens always in the same predetermined axial alinement on said housing when the adaptor plate is fixed by said securing means on said housing.

2. A right angle image reverser for photographic cameras having a lens board with a light opening located opposite the negative plane of the camera, said image reverser comprising a housing having sides disposed at right angles to each other and each having a light opening, a flat first surface reflector within said housing facing and having its reflecting surface disposed in a plane at an angle of 45° to the planes of said housing sides, means for mounting said housing on said lens board with the opening in one side of said housing registering with the opening in said lens board, an adaptor plate carrying a camera lens and disposed over the opening of said other side of said housing with the axis of the lens at an angle of 45° to said reflector surface, means for removably securing said adaptor plate on said reverser housing, and said housing and adaptor plate having portions engageable with each other and cooperating by such engagement to locate said adaptor plate with said lens always in the same axial alinement when the adaptor plate is fixed by said securing means on said reverser housing.

3. A right angle image reverser for photographic cameras comprising a housing having a base and mountable on a camera with said base opposite the negative plane of the camera, said housing having a wall which extends out from said base perpendicularly to the plane thereof, an adaptor plate carrying a camera lens mounted on said housing wall over an opening therein with the axis of the lens at right angles to said wall, a flat first surface reflector which is disposed within said housing facing and at an angle of 45° to both said housing wall and the negative plane of the camera, said housing base having an opening for the passage of an image from the camera lens to said negative plane of the camera, means for removably attaching said adaptor plate on an exterior surface of said housing wall, and said housing wall and adaptor plate having interengaging portions which cooperate to locate said adaptor plate always in the same predetermined position on the reverser housing, whereby different lenses fixed on like adaptor plates are interchangeably mountable in the same predetermined position on the reverser housing.

4. A right angle image reverser for photographic cameras having a lens board with a light opening located opposite the negative plane of the camera, said image reverser comprising a housing having sides disposed at right angles to each other and each having a light opening, a flat first surface reflector within said housing facing and disposed in a plane at an angle of 45° to the planes of said housing sides, means for mounting said housing on said lens board with the opening in one side of said housing registering with the opening in said lens board, an adaptor plate carrying a camera lens and disposed over the opening of said other side of said housing with the axis of the lens at an angle of 45° to said reflector surface, means for removably securing said adaptor plate on said reverser housing, and said housing and adaptor plate having portions engageable with each other and cooperating by such engagement to locate said adaptor plate with said lens always in the same axial alinement when the adaptor plate is fixed by said securing means on said reverser housing, and a slide shutter arranged on said image reverser housing to slide in and out to open and close the opening in one of said sides of the housing.

5. A right angle image reverser for photographic cameras comprising a housing having sides disposed at right angles to each other and each having a light opening, a flat first surface reflector within said housing facing and disposed in a plane at an angle of 45° to the planes of said housing sides, means for mounting said housing on a camera with the opening in one side of said housing located to admit light into the camera in the direction of its optical axis, an adaptor plate carrying a camera lens and removably mountable on an outer surface of said housing with its lens disposed over the opening of said other side of the housing with the axis of the lens at an angle of 45° to said reflector, means for removably securing said adaptor plate in place on said housing, and said housing and said adaptor plate having portions engageable with each other and cooperating by said engagement to determine the position of the adaptor plate on the housing, and said engaging portions of the adaptor plate and housing being disposed to permit the adaptor plate when removed from said housing to be accurately replaced thereon with the axis of the lens always in the same axial alinement.

6. A right angle image reverser for photographic cameras having a lens board with a light opening located opposite the negative plate of the camera, said image reverser comprising a housing having sides disposed at right angles to each other and each having a light opening, a flat first surface reflector within said housing facing and disposed in a plane at an angle of 45° to the planes of said housing sides, means for mounting said housing on said lens board with the opening in one side of said housing registering with the opening in said lens board, an adaptor plate carrying a camera lens and removably mountable on an outer surface of said housing with its lens disposed over the opening of said other side of the housing with the axis of the lens at an angle of 45° to said reflector surface, means for removably securing said adaptor plate in place on said housing, and said housing and said adaptor plate having portions engageable with each other and cooperating by said engagement to determine the position of the adaptor plate on the housing, and said engaging portions of the adaptor plate and housing being disposed to permit the adaptor plate when removed from said housing to be accurately replaced thereon with the axis of the lens always in the same axial alinement.

WILLIAM C. HUEBNER.

REFERENCES CITED

The following references are of record in the file of this patent:

UNITED STATES PATENTS

| Number | Name | Date |
|---|---|---|
| 435,342 | Blackmore | Aug. 26, 1890 |
| 504,425 | Schramm | Sept. 5, 1893 |
| 725,839 | Grubb | Apr. 21, 1903 |
| 739,587 | Case | Sept. 22, 1903 |
| 932,326 | Richardson | Aug. 24, 1909 |
| 1,813,674 | Mihalyi | July 7, 1931 |
| 1,984,544 | Pearlman | Dec. 18, 1934 |
| 2,042,005 | Hutchings | May 26, 1936 |